(12) United States Patent
Nishikawa et al.

(10) Patent No.: US 10,205,347 B2
(45) Date of Patent: Feb. 12, 2019

(54) POWER SUPPLY DEVICE AND POWER SUPPLY METHOD

(71) Applicant: FUNAI ELECTRIC CO., LTD., Osaka (JP)

(72) Inventors: Takafumi Nishikawa, Osaka (JP); Naoyuki Wakabayashi, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 291 days.

(21) Appl. No.: 15/203,821

(22) Filed: Jul. 7, 2016

(65) Prior Publication Data

US 2017/0012473 A1    Jan. 12, 2017

(30) Foreign Application Priority Data

Jul. 10, 2015    (JP) ................................. 2015-138371

(51) Int. Cl.
*H02J 50/10* (2016.01)
*H02J 50/12* (2016.01)
*H02J 50/80* (2016.01)

(52) U.S. Cl.
CPC .............. *H02J 50/10* (2016.02); *H02J 50/12* (2016.02); *H02J 50/80* (2016.02)

(58) Field of Classification Search
None
See application file for complete search history.

(56) References Cited

U.S. PATENT DOCUMENTS

| 2011/0241440 | A1* | 10/2011 | Sakoda | H02J 5/005 307/104 |
| 2012/0306433 | A1 | 12/2012 | Kim et al. | |
| 2014/0333147 | A1* | 11/2014 | Lee | H02J 5/005 307/104 |
| 2015/0022013 | A1* | 1/2015 | Kim | H04B 5/0037 307/104 |
| 2015/0215006 | A1* | 7/2015 | Mehas | H04B 5/0037 307/104 |

FOREIGN PATENT DOCUMENTS

JP    2012135117    7/2012

* cited by examiner

*Primary Examiner* — Jared Fureman
*Assistant Examiner* — Aqeel Bukhari
(74) *Attorney, Agent, or Firm* — JCIPRNET

(57) ABSTRACT

A power supply device that is capable of suppressing complexity of the circuit structure and increasing in the substrate area for the impedance adjustment configuration is provided. The power supply device includes a power supply antenna, supplying a power to a power receiving device, a reactance adjustment part, adjusting a reactance of the power supply antenna; a power source, supplying a voltage to the power supply antenna; and a controller, controlling the reactance adjustment part and the voltage of the power source.

18 Claims, 12 Drawing Sheets

POWER SUPPLY DEVICE AND POWER SUPPLY METHOD

CROSS-REFERENCE TO RELATED APPLICATION

This application claims the priority benefit of Japan application no. 2015-138371, filed on Jul. 10, 2015. The entirety of the above-mentioned patent application is hereby incorporated by reference herein and made a part of this specification.

FIELD OF THE INVENTION

The present invention relates to a power supply device and a power supply method, and in particular to a power supply device having a controller that adjusts the impedance of the power supply device and a power supply method thereof.

DESCRIPTION OF RELATED ART

Conventionally, a power supply device having a controller that adjusts the impedance of the power supply device has been known (e.g. Patent Document 1: Japanese Patent-Laid Open No. 2012-135117).

Patent Document 1 discloses a power supply device having a controller that adjusts the impedance of the power supply device. The power supply device includes an AC power source, a power transmission resonator that transmits power to a power receiving device, an impedance controller, and a matching circuit that controls the impedance of the power transmission side. The power supply device of Patent Document 1 is configured to that the input impedance of the AC power source and the output impedance of the power transmission resonator can be matched by disposing the impedance controller and the matching circuit.

Also, in the power supply device of Patent Document 1, the matching circuit includes a capacitor, connected in parallel to the AC power source and the power transmission resonator, for adjusting the real part of the impedance, and a capacitor, connected in series to the AC power source and the power transmission resonator, for adjusting the imaginary part of the impedance.

The power supply device of Patent Document 1, however, has problems of complex circuit structure and an increase in the substrate area because the matching circuit uses capacitors for adjusting both the real part and the imaginary part of the impedance.

SUMMARY OF THE INVENTION

The present disclosure is to address the abovementioned issues, and provides a power supply device capable of suppressing the complexity of the circuit structure and the increase in the substrate area for the impedance adjustment, and a power supply method thereof.

A power supply device according to an embodiment of the present invention includes a power supply antenna that supplies power to a power receiving device, a reactance adjustment part that varies the reactance of the power supply antenna, a power source that supplies a voltage to the power supply antenna, and a controller that controls the reactance adjustment part and the voltage of the power source. The reactance is the imaginary part of the impedance.

The power supply device according to an embodiment of the present invention is to adjust the resistance by controlling the voltage of the power source and does not require separate capacitors for adjusting the resistance. Thus, the power supply device is capable of suppressing the complexity of the circuit structure and the increase in the substrate area for impedance adjustment because disposing separate capacitors for adjusting the resistance can be precluded. The resistance is the real part of the impedance.

In the power supply device according to an embodiment of the present invention, it is preferable that the power source includes a switching element switched at a predetennined drive frequency, and that the controller controls the voltage value applied to the switching element according to the switching of the switching element switched by controlling the voltage of the power source. With such configuration, power loss can be reduced and the power supply efficiency of the power receiving device can be improved because the voltage value applied to the switching element can be set to be substantially zero when the switching element is being switched.

In this case, it is preferable that the power supply device includes a communication part from which the power receiving device obtains information of the receiving voltage. Also, the power supply device includes an input power measurement part from which the power receiving device measures the input power provided to the power supply antenna, and an efficiency calculation part from which the power receiving device calculates the power receiving efficiency of the power receiving device from the input power and the receiving voltage. It is preferable that the controller adjusts the resistance of the power supply antenna based on the power receiving efficiency. With such configuration, the circuit structure can be simplified and the substrate area can be reduced, compared to that with capacitors disposed separately for adjusting resistance because the resistance is adjusted by controlling the power source. Also, the circuit structure can be further simplified and the substrate area can be further reduced because disposing an impedance detector in the power supply device can be precluded.

In the above-mentioned power supply device that adjusts the resistance based on the power receiving efficiency, it is preferable that the communication part obtains information of a predetennined voltage range of the power receiving device, and that the controller adjusts the resistance of the power supply antenna while the receiving voltage is within the predetermined voltage range by controlling the voltage of the power source. With such configuration, it is possible to safely operate the power receiving device and simplify the configuration for adjusting impedance as well because occurrences of excessive increase more than the maximum operation voltage and excessive decrease less than the minimum operation voltage to the receiving voltage of the power receiving device can be suppressed.

It is preferable that the power supply device according to an embodiment of the present invention includes an impedance detector that detects impedance of the power supply antenna. Also, the controller adjusts the resistance of the power supply antenna based on the impedance detected by the impedance detector. With such configuration, the circuit structure can be simplified and the substrate area can be reduced compared to that with separate capacitors disposed for adjusting resistance because the resistance is adjusted by controlling the power source. Also, the impedance can be adjusted more reliably because the impedance of the power supply antenna is measured by the impedance detector.

It is preferable that the power supply device according to an embodiment of the present invention includes a power measurement part that measures the input power provided to the power supply antenna and output power. Also, the power supply device includes a conversion efficiency calculation part that calculates a conversion efficiency of power from the input power and the output power. It is preferable that the controller adjusts the resistance of the power supply antenna based on the conversion efficiency. With such configuration, the circuit structure can be simplified and the substrate area can be reduced because the impedance is adjusted based on the input/output power of the power supply antenna, and it is not necessary to the disposition of an impedance detector and a communication part in the power receiving device can be precluded.

In the power supply device according to an embodiment of the present invention, it is preferable that the power supply antenna includes a resonant capacitor that adjusts the reactance of the power supply antenna. Also, the controller adjusts the reactance of the power supply antenna by adjusting the capacitance of the resonant capacitor. By such a configuration, the voltage value applied to the switching element becomes substantially zero when the switching element is being switched because the reactance is adjusted to a preferred value, and as a result, the power loss can be reduced and the power supply efficiency to the power receiving device can be improved.

In this case, it is preferable that the resonant capacitor has a plurality of capacitors. The reactance adjustment part includes a switch part that connects the power source and each of the plurality of capacitors. It is preferable that the controller adjusts the reactance of the power supply antenna by connecting the power source to at least one of the plurality of capacitors. By such a configuration, the power loss can be reduced and the power supply efficiency to the power receiving device can be improved since the voltage value applied to the switching element can be set to be substantially zero when the switching element is being switched. Also, the reactance can be adjusted more reliably because the adjustment width is wider compared to a case with a single capacitor when adjusting the reactance.

A power supply method according to an embodiment of the present invention includes adjusting a resistance of a power supply antenna that supplies a power to a power receiving device by adjusting a supply voltage to the power supply antenna; and adjusting a reactance of the power supply antenna by controlling a reactance adjustment part that varies the reactance of the power supply antenna.

According to the power supply method of the present invention, the power supply method is capable of suppressing the complexity of the circuit structure and the increase in the substrate area for the impedance adjustment configuration because disposing capacitors for adjusting resistance can be precluded. The reason is that the resistance is adjusted by controlling voltage of a power source to adjust the supply voltage to the power supply antenna.

According to the present disclosure, as mentioned above, a power supply device and a power supply method that is capable of suppressing the complexity of the circuit structure and the increase in the substrate area for the impedance adjustment configuration.

DETAILED DESCRIPTION OF THE EMBODIMENTS

Embodiments of the present disclosure are described below based on accompanying drawings.

First Embodiment

Figure 1:
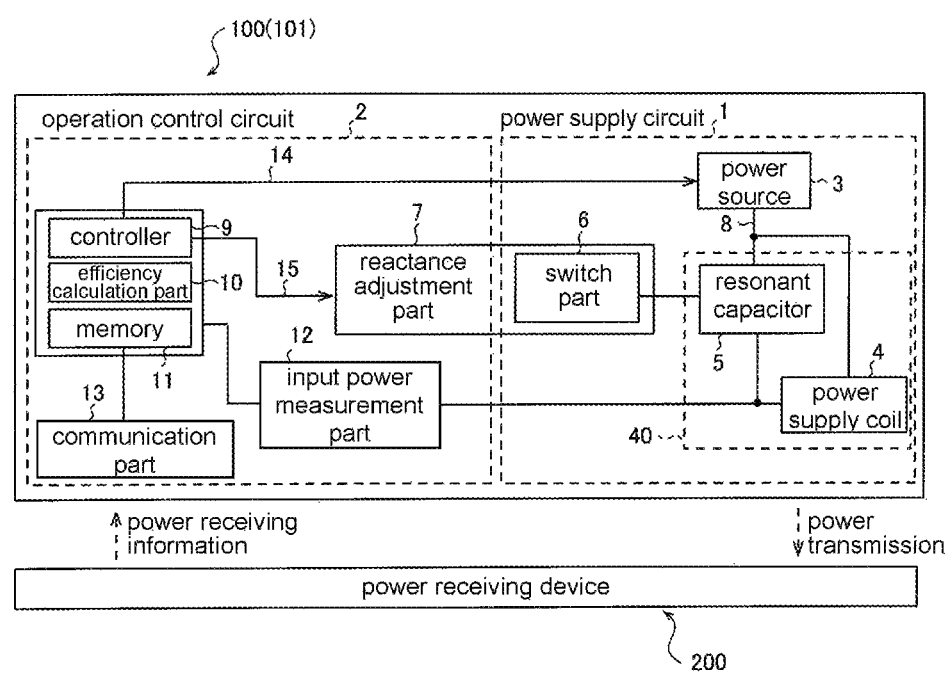
FIG. 1 is a block diagram illustrating an overall configuration of a power supply device and a power receiving device according to the first embodiment and the second embodiment of the present invention.
Figure 2:
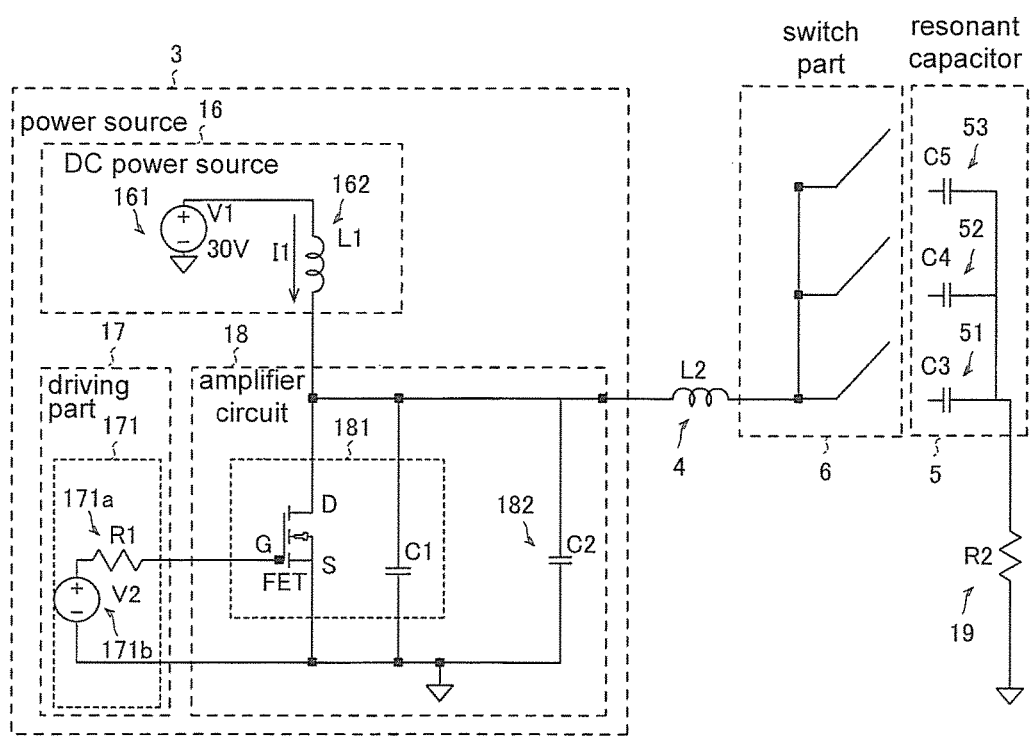
FIG. 2 is a block diagram illustrating a configuration of the power supply circuit according to the first embodiment to the fourth embodiment of the present invention.

A power supply device 100 according to the first embodiment of the present invention is described with reference to FIGS. 1 and 2. As shown in FIGS. 1 and 2, the power supply device 100 is configured as a power source device which includes a power supply circuit 1 capable of zero-voltage switching. The power supply device 100 is configured to supply power to a power receiving device 200 disposed near the power supply device 100 (as a wireless power supply device or a contactless power supply device) by using a magnetic resonance method without disposing wires and contact points, etc. between the power supply device 100 and power receiving device 200.

(Overall Configuration of Power Supply Device)

As shown in FIG. 1, the power supply circuit 1 and an operation control circuit 2 are disposed in the power supply device 100.

(Configuration of Power Supply Circuit)

As shown in FIG. 1, a power source 3, a power supply coil 4, a resonant capacitor 5 and a switch part 6 are disposed in the power supply device 100, and a power supply antenna 40 includes the power supply coil 4 and the resonant capacitor 5. A reactance adjustment part 7, which is described below, includes the switch part 6. The power source 3 is connected to the power supply coil 4 and the resonant capacitor 5 via a cable 8. The power supply device 100 is configured to supply power to the power supply coil 4 from the power source 3 via the cable 8.

(Configuration of Operation Control Circuit)

As shown in FIG. 1, the operation control circuit 2 includes a controller 9, an efficiency calculation part 10, a memory 11, an input power measurement part 12, a communication part 13 and the reactance adjustment part 7. The controller 9 and the power source 3 are connected via a cable 14, and the controller 9 and the reactance adjustment part 7 are connected via a cable 15. The controller 9 controls the operation of the power supply circuit 1 by transmitting operation signals to the power source 3 via the cable 14 and to the reactance adjustment part 7 via the cable 15. The efficiency calculation part 10 is an example of the "conversion efficiency calculation part" of the present invention.

(Configuration of Each Part Of Power Supply Circuit)

As shown in FIG. 2, the power source 3 includes a DC power source 16, a driving part 17 and an amplifier circuit 18.

As shown in FIG. 2, the DC power source 16 includes a power converter 161 and a choke coil 162. The power converter 161 is configured to convert an acquired power to a DC power having a voltage value V1 according to a command from the controller 9. The choke coil 162 has an inductance L1, and is configured to make a current value corresponding to the power acquired from the power converter 161 to be substantially constant with a current value I1. The DC power source 16 is configured to acquire power from an external commercial power source (not depicted) or a battery (not depicted).

As shown in FIG. 2, a gate driving circuit 171 is disposed in the driving part 17. The gate driving circuit 171 includes a resistor 171a having a resistance value R1 and a pulse generator 171b that generates a pulse having a driving frequency fd and a voltage value V2.

As shown in FIG. 2, the amplifier circuit 18 includes a switching element 181 and a shunt capacitor 182. The switching element 181 is, for example, configured as an FET (Field Effect Transistor) having a parasitic capacitance C1. The gate (G) of the switching element 181 is connected to the gate driving circuit 171, and is configured to turn the connection between the drain (D) and the source (S) on and off by obtaining a gate driving signal from the gate driving circuit 171 (driving part 17). The drain of the switching element 181 is connected to the DC power source 16. The source of the switching element 181 is grounded. In FIG. 2, the FET and the parasitic capacitance C1 are separately depicted for the convenience of explanation, but the parasitic capacitance C1 is included in the FET.

As shown in FIG. 2, the shunt capacitor 182 has a capacitance C2. The shunt capacitor 182 is connected in parallel to the switching element 181.

As shown in FIG. 2, the power supply coil 4 has an inductance L2 and is connected to the drain of the switching element 181 of the amplifier circuit 18. The amplifier circuit 18 is configured to supply an AC power having the driving frequency fd to the power supply coil 4 by turning the switching element 181 on and off with the driving frequency fd. The internal resistor 19 includes internal resistors inside the power supply coil 4 and the resonant capacitor 5. The internal resistor 19 has a resistance R2, and the resistance R2 is varied by magnetically coupling the power supply coil 4 with the power receiving device 200.

As shown in FIG. 2, the switch part 6 is disposed between the power supply coil 4 and the resonant capacitor 5, and the resonant capacitor 5 includes capacitors 51, 52 and 53. The capacitors 51, 52 and 53 respectively have capacitances C3, C4 and C5. The switch part 6 is configured to connect the power supply coil 4 and the resonant capacitor 5, and includes three switches that respectively connect the capacitors 51, 52 and 53 to the power supply coil 4.

The power receiving device 200 includes a power receiving antenna, etc. (not depicted), and, for example, is included in a smart phone. The power receiving antenna of the power receiving device 200 is configured to receive power from the power supply device 100 by coupling with a magnetic field for power supply of the power supply coil 4.

Here, in the first embodiment, as shown in FIG. 2, the power source 3 includes the switching element 181 which is switched by the predetermined driving frequency. The controller 9 is configured to control the voltage value applied to the switching element 181 when the switching element 181 is switched by controlling the voltage of the power source 3. Specifically, the voltage value applied to the switching element 181 is controlled to become close to substantially zero at the time the switching element 181 is switched. In addition, the controller 9 is configured to adjust the resistance of the power supply antenna 40 and control the reactance adjustment part 7 to adjust the reactance of the power supply antenna 40. Specifically, the resistance is adjusted by controlling the supply voltage to the power source 3. Also, the reactance is adjusted by controlling the reactance adjustment part 7 and by controlling the connection between the power supply coil 4 and the resonant capacitor 5 by the switch part 6. The detailed explanation is as follows.

(Operation Point Adjustment Process of Power Supply Circuit)

Next, the flow of the operation point adjustment process of the power supply circuit 1 by the power supply device 100 of the first embodiment is described with reference to FIG. 3.

Firstly, in step S1, power is supplied to the power supply coil 4 (refer to FIG. 1).

In step S2, the supply voltage is set to the settable lower-limit value.

In step S3, at the set supply voltage, the input power to the power supply coil 4 is measured by the input power measurement part 12 (refer to FIG. 1) and the information of the receiving voltage of the power receiving device 200 is received by the corrununication part 13 (refer to FIG. 1).

In step S4, the power receiving efficiency, which is the ratio of the input power to the receiving voltage, is calculated by the efficiency calculation part 10 (refer to FIG. 1).

In step S5, the power receiving efficiency is stored in the memory 11 (refer to FIG. 1).

In step S6, whether the supply voltage is the settable upper-limit value or not is determined. The process continues to step S7 if the supply voltage is not consistent with the settable upper-limit value, and continues to step S8 otherwise.

In step S7, the supply voltage is increased, and the process returns to step S3.

In step S8, the supply voltage is set to a value with which the power receiving efficiency stored in the memory 11 in step S5 becomes the maximum. Thereby, the resistance is adjusted.

In step S9, the first switch (n=1, serial number) of the switch part 6 is selected.

In step S10, the selected switch (the n-th) is turned on, and the other switches are turned off In step S11, while the selected switch is turned on, the input power to the power supply coil 4 is measured by the input power measurement part 12 (refer to FIG. 1), and the information of the receiving voltage of the power receiving device 200 is received by the communication part 13 (refer to FIG. 1).

In step S12, the power receiving efficiency, which is the ratio of the input power to the receiving voltage, is calculated by the efficiency calculation part 10 (refer to FIG. 1).

In step S13, the power receiving efficiency is stored in the memory 11 (refer to FIG. 1).

In step S14, whether the serial number (n) of the selected switch matches with the number of the provided switches or not is determined. If the serial number (n) of the selected switch does not match with the number of the disposed switches, the process continues to step S15, otherwise (i.e., n=3) the process continues to step S16.

In step S15, n is set to n+1, and the process returns to the step S10.

In step S16, the switch to be selected is set to a switch with which the power receiving efficiency stored in the step S13 becomes the maximum. Thereby, the reactance adjustment part 7 (switch part 6) is controlled, and thus the reactance of the power supply antenna 40 is adjusted. As a result, it is possible to set the voltage value applied to the switching element 181 to be substantially zero when the switching element 181 is being switched.

(Effects of First Embodiment)

The following effects can be obtained from the first embodiment.

As mentioned above, the first embodiment is configured to include the power supply antenna 40 supplying power to the power receiving device 200, the reactance adjustment part 7 adjusting the reactance of the power supply antenna 40, the power source 3 supplying the supply voltage to the power supply antenna 40, and the controller 9 controlling the reactance adjustment part 7 and the voltage of the power source 3. Thereby, it is possible to suppress the complexity of the circuit structure and the increase in the substrate area for the impedance adjustment configuration because disposing separate capacitors for adjusting resistance is precluded.

Also, in the first embodiment, as mentioned above, the controller 9 is configured to control the voltage value applied to the switching element 181 at the time the switching element 181 is switched by controlling the voltage of the power source 3. Thereby, the power loss can be reduced and the power supply efficiency to the power receiving device 200 can be improved because it is possible to set the voltage value applied to the switching element 181 to be substantially zero when the switching element 181 is being switched.

Also, in the first embodiment, as mentioned above, the controller 9 is configured to adjust the resistance of the power supply antenna 40 by controlling the voltage of the power source 3 based on the power receiving efficiency. Thereby, the circuit structure can be simplified and the substrate area can be reduced compared to that with separated capacitors disposed for adjusting resistance because the resistance is adjusted by controlling the power source 3 without disposing separate capacitors for adjusting the resistance. Also, the circuit structure can be further simplified and the substrate area can be further reduced because the disposition of the impedance detector 20 (to be mentioned later) in the power supply device 100 is precluded.

Also, in the first embodiment, as mentioned above, the controller 9 is configured to adjust the reactance of the power supply antenna 40 by controlling the reactance adjustment part 7 to select a capacitor to be connected and by adjusting the capacitance of the resonant capacitor 5. As such, because the reactance is adjusted to a preferred value, the voltage value applied to the switching element 181 becomes substantially zero when the switching element 181 is being switched. As a result, power loss can be reduced and the power supply efficiency of the power receiving device 200 can be improved.

Also, in the first embodiment, as mentioned above, the controller 9 is configured to adjust the reactance of the power supply antenna 40 by connecting at least one of the plurality of capacitors 51 to 53 of the resonant capacitor 5 to the power supply coil 4 by controlling on/off of the switch part 6. As such, the reactance can be adjusted more properly when adjusting the reactance because the adjustment width is wider compared to the case in which the number of the capacitors of the resonant capacitor 5 is one.

Second Embodiment (Operation Point Adjustment Process of Power Supply Circuit)

Next, the flow of the operation point adjustment process of the power supply circuit 1 by a power supply device 101 of the second embodiment is described with reference to FIG. 4. In the second embodiment, in addition to the configuration of the first embodiment, the communication part 13 is configured to obtain information of a predetermined voltage range of the power receiving device 200. In the second embodiment, the predetermined voltage range is, for example, a range between the maximum operation voltage and the minimum operation voltage. Components that are the same as those of the first embodiment are depicted with the same reference numerals, and descriptions thereof will be omitted hereinafter.

Firstly, in step S21, the power is supplied to the power supply coil 4 (refer to FIG. 1).

In step S22, the supply voltage is set to the settable lower-limit value.

In step S23, at the set supply voltage, the input power to the power supply coil 4 is measured by the input power measurement part 12 (refer to FIG. 1) and information related to the receiving voltage of the power receiving device 200 is received by the communication part 13 (refer to FIG. 1).

In step S24, the power receiving efficiency, which is the ratio of the input power to the receiving voltage, is calculated by the efficiency calculation part 10 (refer to FIG. 1).

In step S25, the power receiving efficiency is stored in the memory 11 (refer to FIG. 1).

In step S26, whether the supply voltage is the settable upper-limit value or not is determined. The process continues to step S27 if the supply voltage is not consistent with the settable upper-limit value, otherwise, continues to step S28.

In step S27, the supply voltage is increased, and the process returns to the step 23.

In step S28, the supply voltage is set to a value with which the power receiving efficiency stored in the memory 11 in the step S25 becomes the maximum.

In step S29, the first switch (n=1) of the switch part 6 is selected.

In step S30, the selected switch (the n-th) is turned on, and the other switches are turned off In step S31, while the selected switch is turned on, the input power to the power supply coil 4 is measured by the input power measurement part 12 (refer to FIG. 1), and information related to the receiving voltage of the power receiving device 200 is received by the communication part 13 (refer to FIG. 1).

In e step S32, the power receiving efficiency, which is the ratio of the input power to the receiving voltage, is calculated by the efficiency calculation part 10 (refer to FIG. 1).

In step S33, the power receiving efficiency is stored in the memory 11 (refer to FIG. 1).

In step S34, whether the serial number (n) of the selected switch matches with the number of the provided switches or not is determined. If the serial number of the selected switch does not match with the number of the provided switches, the process continues to step S35, otherwise (i.e., n=3), the process proceeds to step S36.

In step S35, n is set to n+1, and the process returns to step S30.

In step S36, the switch to be selected is set to a switch with which the power receiving efficiency stored in the step S33 becomes the maximum.

In step S37, from the power receiving device 200, the communication part 13 obtains information of the receiving voltage of the power receiving device 200 as well as the maximum operation voltage and the minimum operation voltage which are defined by the specification of the power receiving device 200.

In step S38, whether the receiving voltage of the power receiving device 200 is larger than the maximum operation voltage or not is determined. If the receiving voltage is larger than the maximum operation voltage, the process continues to step S39, otherwise the process continues to step S40.

In step S39, the power source 3 is controlled to reduce the supply voltage by a predetermined voltage. Then, the process returns to step S37.

In step S40, whether the receiving voltage of the power receiving device 200 is lower than the minimum operation voltage or not is determined. If the receiving voltage is lower than the minimum operation voltage, the process continues to step S41.

In step 41, the power source 3 is controlled to increase the supply voltage by a predetermined voltage. Then, the process returns to step S37. The operations from step S37 to step S41 are repeated until the receiving voltage of the power receiving device 200 falls within a range between the maximum operation voltage and the minimum operation voltage.

(Effects of Second Embodiment)

The following effects can be obtained from the second embodiment.

In the second embodiment, as mentioned above, the controller 9 is configured to adjust the resistance of the power supply antenna 40 while the receiving voltage is within the range between the maximum operation voltage and the minimum operation voltage by controlling the voltage of the power source 3. As such, the configuration for adjusting impedance can be simplified while operating the power receiving device safely because the occurrences of excessive increase larger than the maximum operation voltage and excessive decrease lower than the minimum operation voltage of the receiving voltage to the power receiving device 200 can be suppressed.

Other effects of the second embodiment are the same as the effects of the first embodiment.

Third Embodiment

The configuration of a power supply device 300 according to the third embodiment of the present invention is described with reference to FIG. 5. In the third embodiment, the resistance and the reactance are adjusted by directly measuring the load of the power supply antenna 40, which is different from the power supply device of the first embodiment, in which the power receiving efficiency is calculated. Components that are the same as those of the first embodiment are depicted with the same reference numerals, and descriptions thereof will be omitted hereinafter.

(Configuration of Operation Control Circuit)

Figure 5:
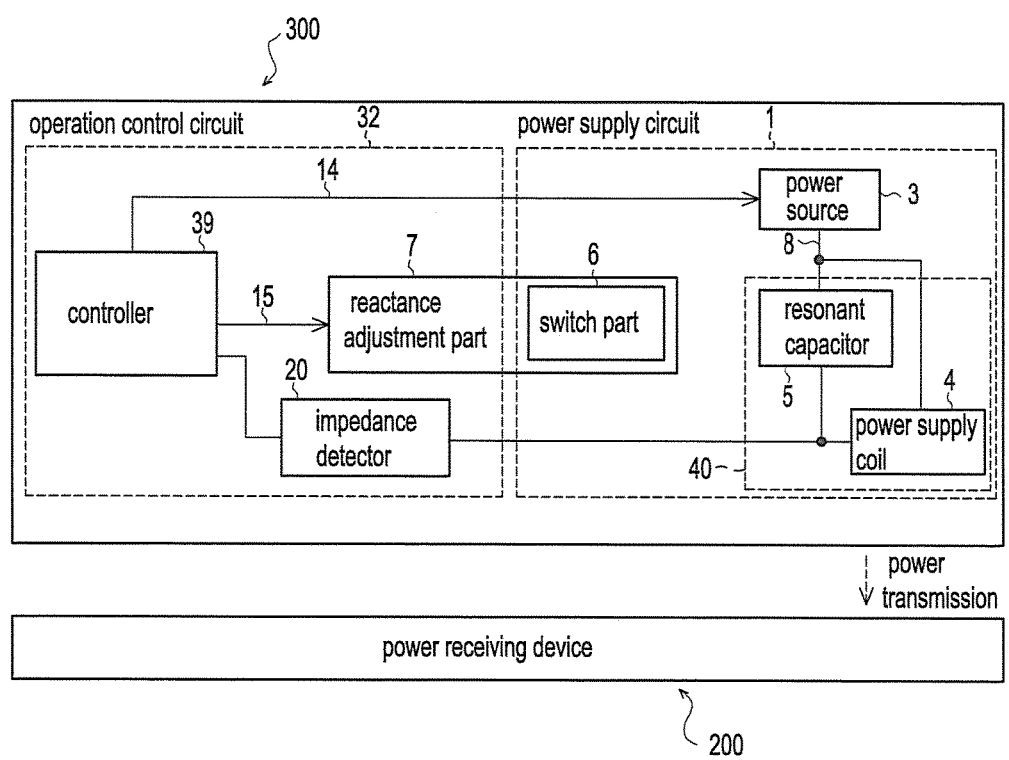
FIG. 5 is a block diagram illustrating an overall configuration of a power supply device and a power receiving device according to the third embodiment of the present invention.

As shown in FIG. 5, a controller 39, an impedance detector 20 and the reactance adjustment part 7 are disposed in an operation control circuit 32.

(Operation Point Adjustment Process of Power Supply Circuit)

Next, the flow of the operation point adjustment process of the power supply circuit 1 according to the power supply device 300 of the third embodiment is described with reference to FIG. 6.

Firstly, in step S51, the power is supplied to the power supply coil 4 (refer to FIG. 5).

In step S52, the load Z (R+jXΩ) of the power supply antenna 40 is measured by the impedance detector 20 (refer to FIG. 5).

In step S53, whether the resistance (R) measured in the step S52 is consistent with a preferred value or not is determined. If the resistance is not consistent with the preferred value, the process continues to step S54, otherwise, the process continues to step S57.

In step S54, whether the resistance (R) measured in the step S52 is less than the preferred value or not is determined. If the resistance is less than the preferred value, the process continues to step S55, otherwise the process continues to step S56.

In step S55, the power source 3 (refer to FIG. 5) is controlled to increase the supply voltage by a predetermined voltage. Then, the process returns to the step S52.

In step S56, the power source 3 is controlled to reduce the supply voltage by the predetemined voltage. Then, the process returns to the step S52.

In step S57, the first switch (n=1) of the switch part 6 is selected.

In step S58, the selected switch (the n-th) is turned on, and the other switches are turned off In step S59, the load Z (R+jXΩ) of the power supply antenna 40 is measured by the impedance detector 20 while the selected switch is turned on.

In step S60, whether the reactance (X) measured in the step S59 is consistent with a preferred value or not is determined. If the reactance is not consistent with the preferred value, the process continues to step S61.

In step S61, n is set to n+1, and the process returns to step S59. That is, the operations from step S59 to step S61 are repeated until the reactance (X) reaches the preferred value.

The other configuration of the power supply device 300 according to the third embodiment is the same as the configuration of the power supply device 100 according to the first embodiment.

(Effects of Third Embodiment)

The following effects can be obtained from the third embodiment. In the third embodiment, as mentioned above, the controller 39 is configured to adjust the resistance of the power supply antenna 40 based on the impedance detected by the impedance detector 20. As such, the circuit structure can be simplified and the substrate area can be reduced compared to that with separate capacitors disposed for adjusting resistance because the resistance is adjusted by controlling the power source 3. Also, the impedance can be adjusted more reliably since the impedance of the power supply antenna 40 is measured by the impedance detector 20. Other effects of the third embodiment are the same as the effects of the first embodiment.

Fourth Embodiment

The configuration of a power supply device 400 according to the fourth embodiment of the present invention is described with reference to FIG. 7. In the fourth embodiment, the resistance and the reactance are adjusted based on a conversion efficiency which is a ratio of the input power provided to the power supply coil 4 to the output power, which is different from that the first embodiment is configure to calculate the power receiving efficiency. Components that are the same as those of the first embodiment are depicted with the same reference numerals, and descriptions thereof will be omitted hereinafter.

(Configuration of Operation Control Circuit)

Figure 7:
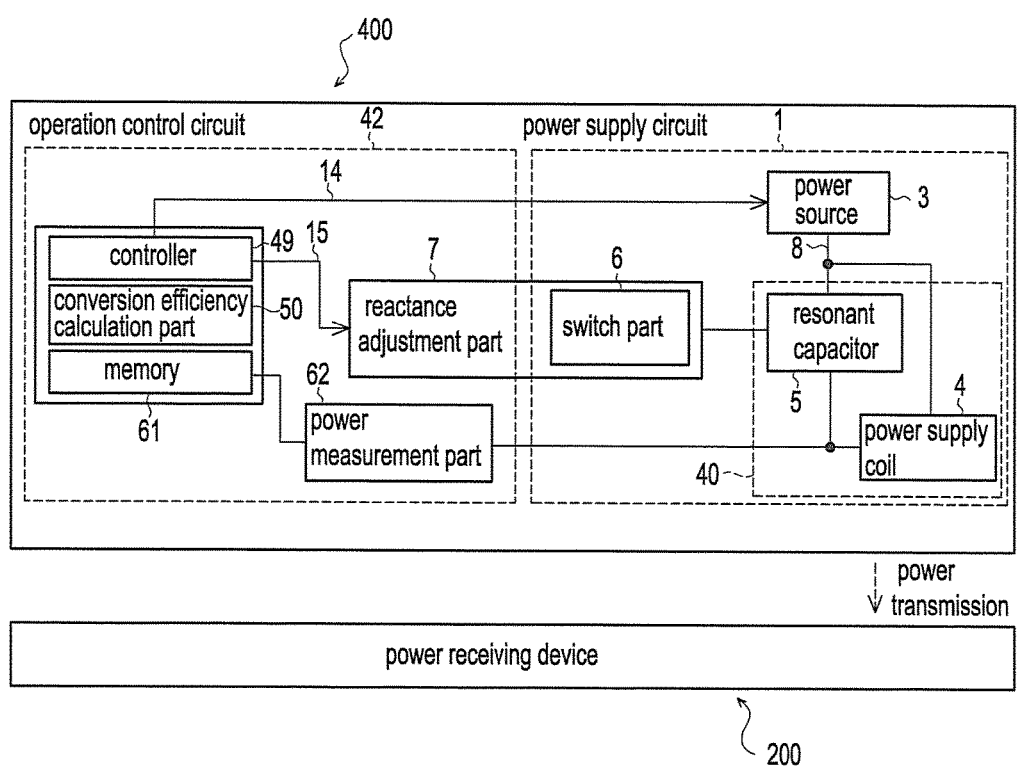
FIG. 7 is a block diagram illustrating an overall configuration of a power supply device and a power receiving device according to the fourth embodiment of the present invention.

As shown in FIG. 7, a controller 49, a conversion efficiency calculation part 50, a memory 61, a power measurement part 62 and the reactance adjustment part 7 are disposed in the operation control circuit 42.

(Operation Point Adjustment Process of Power Supply Circuit)

Next, the flow of the operation point adjustment process of the power supply circuit 1 according to the power supply device 400 of the fourth embodiment is described with reference to FIG. 8.

Firstly, in step S71, the power is supplied to the power supply coil 4 (refer to FIG. 7).

In step S72, the supply voltage is set to the settable lower-limit value.

In step S73, at the set supply voltage, the input power to the power supply coil 4 and the output power are measured by the power measurement part 62 (refer to FIG. 7).

In step S74, the conversion efficiency, which is the ratio of the input power to the output power, is calculated by the conversion efficiency calculation part 50 (refer to FIG. 7).

In step S75, the conversion efficiency is stored in the memory 61 (refer to FIG. 7).

In step S76, whether the supply voltage is consistent with the settable upper-limit value or not is determined. If the supply voltage is not consistent with the settable upper-limit value, the process continues to step S77, otherwise the process continues to step S78.

In step S77, the supply voltage is increased, and the process returns to the step S73.

In step S78, the supply voltage is set to a value at which the conversion efficiency stored in the memory 61 in the step S75 becomes the maximum.

In step S79, the first switch (n=1) of the switch part 6 is selected.

In step S80, the selected switch (the n-th) is turned on, and the other switches are turned off In step S81, the input power provided to the power supply coil 4 and the output power are measured by the power measurement part 62 (refer to FIG. 7) while the selected switch is turned on.

In step S82, the conversion efficiency, which is the ratio of the input power to the output power, is calculated by the conversion efficiency calculation part 50 (refer to FIG. 7).

In step S83, the conversion efficiency is stored in the memory 61 (refer to FIG. 7).

In step S84, whether the serial number (n) of the selected switch is consistent with the number of the provided switches or not is determined. If the serial number of the selected switch is not consistent with the number of the provided switches, the process continues to step S85, otherwise (i.e., n=3), the process continues to step S86.

In step S85, n is set to n+1, and the process returns to the step S80.

In step S86, the switch to be selected is set to a switch with which the conversion efficiency stored in the step S83 becomes maximum.

The other configuration of the power supply device 400 according to the fourth embodiment is the same as the configuration of the power supply device 100 according to the first embodiment.

(Effects of Fourth Embodiment)

The following effects can be obtained from the fourth embodiment.

In the fourth embodiment, as mentioned above, the controller 49 is configured to adjust the resistance of the power supply antenna 40 based on the conversion efficiency. As such, by adjusting the impedance based on the input power and the output power of the power supply coil 4, the circuit structure can be further simplified and the substrate area can be further reduced because disposing the impedance detector 20 and the communication part 13 in the power supply device 400 can be precluded.

Other effects of the power supply device 400 according to the fourth embodiment are the same as the effects of the power supply device 100 according to the first embodiment.

Modified Examples of First to Fourth Embodiments

Figure 9:
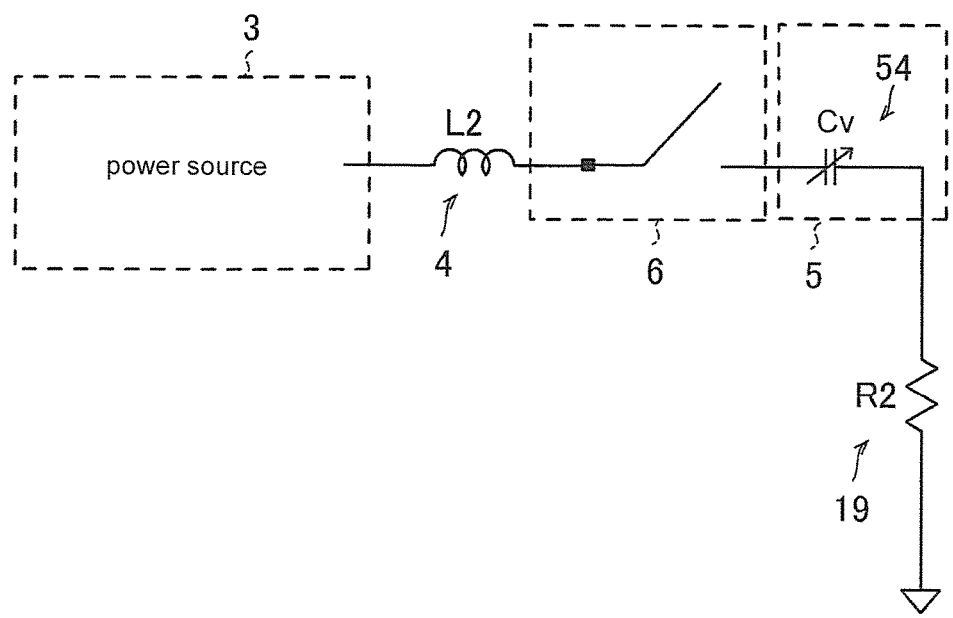
FIG. 9 is a circuit diagram illustrating a configuration of the power supply circuit according to a modified example of the first to fourth embodiments of the present invention.

FIG. 9 is a modified example of the circuit structure of the power supply circuit according to the first to fourth embodiments shown in FIG. 2. In FIG. 9, Components that are the same as those in FIG. 2 are depicted with the same reference numerals, and descriptions thereof will be omitted hereinafter. As shown in FIG. 9, the switch part 6 is disposed between the power supply coil 4 and the resonant capacitor 5, and includes a switch. The resonant capacitor 5 includes a variable capacitor 54, and the variable capacitor 54 has a capacitance Cv. The capacitance Cv of the variable capacitor 54 may vary stepwise or continuously without intermittence. In this embodiment, it is assumed that the capacitance Cv of the variable capacitor 54 is defined as $Cv=C0+n\Delta C$, and the maximum of the capacitance Cv is Cmax.

In this modified example, the resistance of the power supply antenna 40 can be adjusted by varying the capacitance Cv of the variable capacitor 54 connected to the power supply coil 4 after turning the switch of the switch part 6 on, which is different from the operation of the circuit configuration of FIG. 2. In this example, the capacitance to be varied every time is $\Delta C$, and the range of the capacitance to be varied is from the initial value C0 to the maximum Cmax $(C0+n\Delta C)$.

Modified Example of First and Second Embodiments

Figure 3:
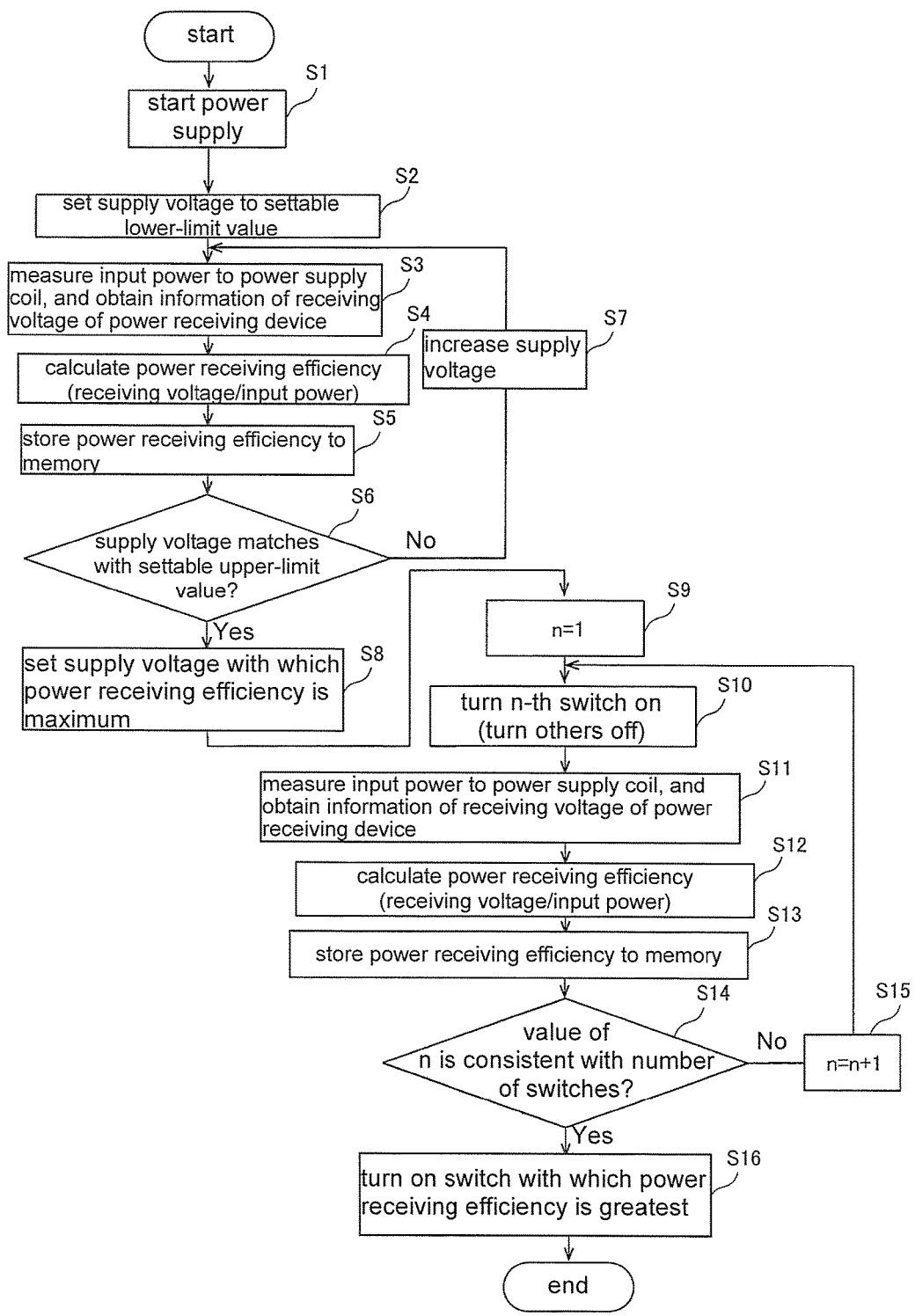
FIG. 3 is a flow chart describing an adjusting method of the operation point of the power supply circuit according to the first embodiment of the present invention.
Figure 4:
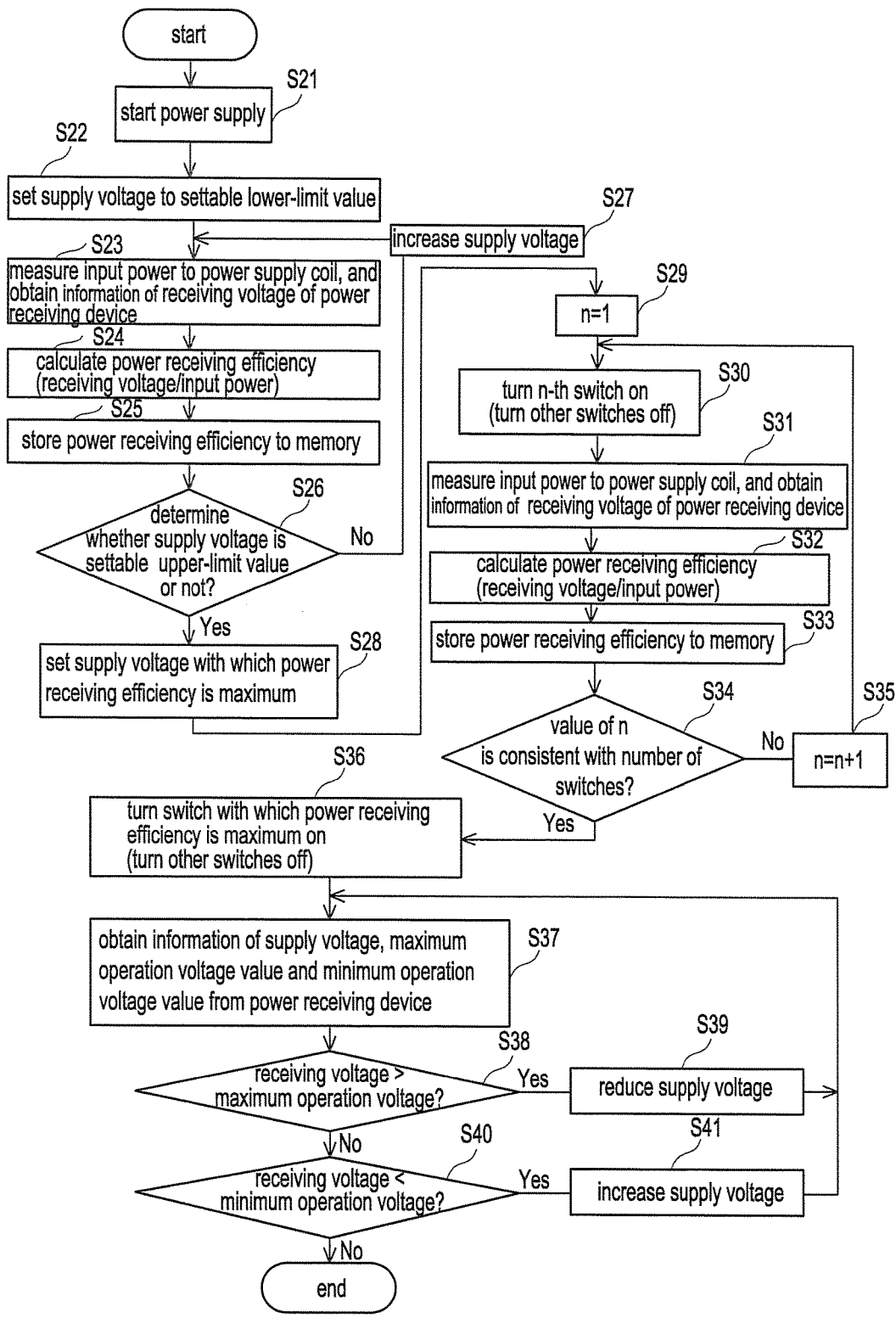
FIG. 4 is a flow chart describing an adjusting method of the operation point of the power supply circuit according to the second embodiment of the present invention.
Figure 10:
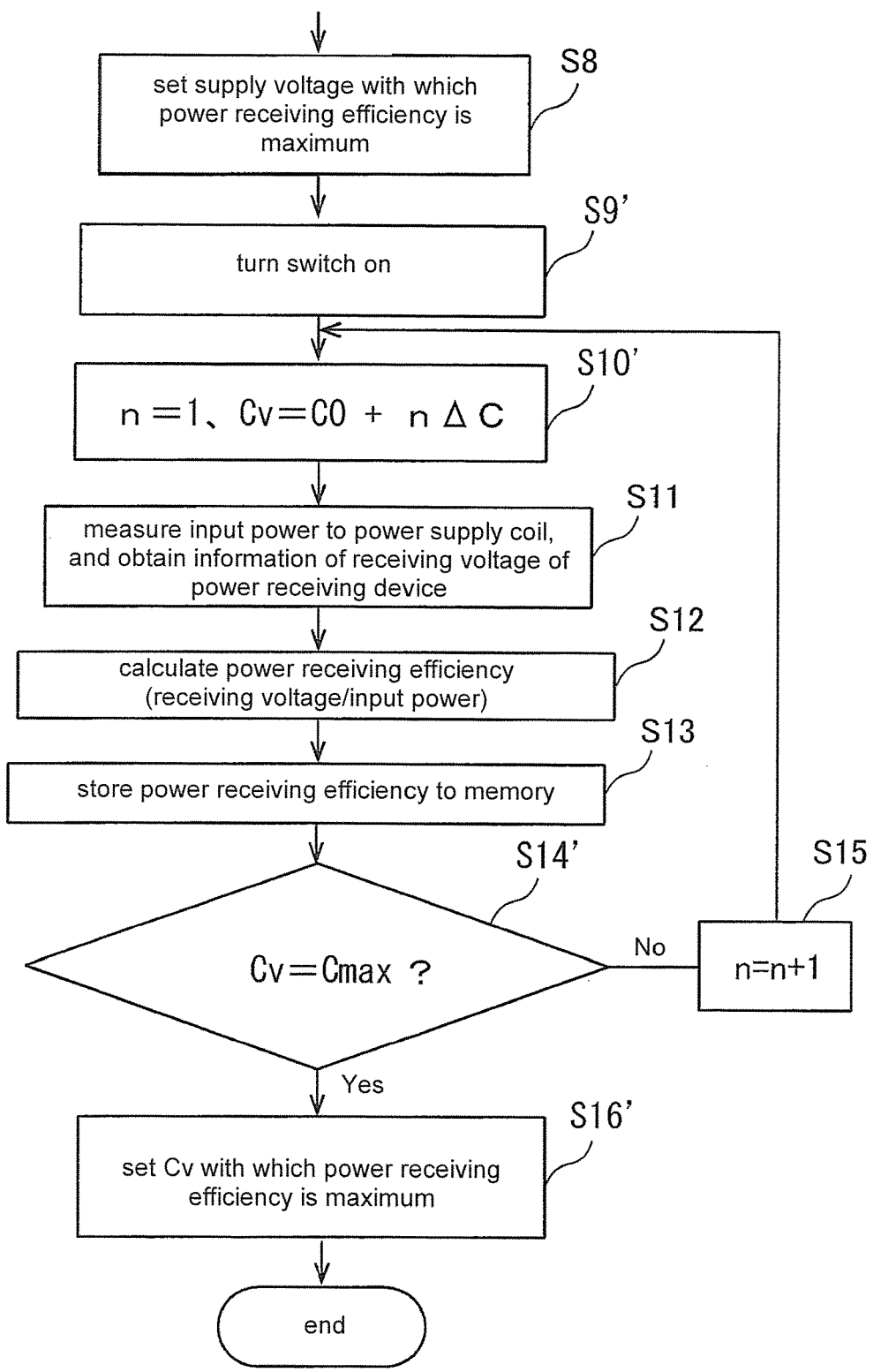
FIG. 10 is a flow chart describing an adjustment method of the operation point of the power supply circuit according to a modified example of the first and second embodiments.

FIG. 10 is a modified example of the flow of the operation point adjustment process of the power supply circuit 1 in FIGS. 3 and 4, and the switch part 6 and the resonant capacitor 5 herein have the circuit configuration illustrated in FIG. 9. The difference between FIG. 10 and FIG. 3 (FIG. 4) lies in steps S9 to S16 of FIG. 3 (steps S29 to S36 of FIG. 4), and herein, the steps S9, S10, S14 and S16 of FIG. 3 (the steps S29, S30, S34 and S36 of FIG. 4) are replaced with the steps S9', S10', S14' and S16' of FIG. 10. Only different steps that are different are described below.

In step S9', the switch of the switch part 6 is turned on. Besides, in step S10', the capacitance Cv of the resonant capacitor 5 is set to $C0+\Delta C$ (n=1).

In steps S11 to S13, the operations are the same as those in steps S11 to S13 of FIG. 3; therefore, the description thereof is omitted.

In step S14', whether the capacitance Cv of the variable capacitor 54 reaches the maximum Cmax or not is determined. If the capacitance Cv is not consistent with the maximum Cmax, the process continues to the step S15, in which n is set to n+1, and then the process returns to the step S10', and the next capacitance Cv is set to C0+2ΔC (n=2, for example). If the capacitance Cv is consistent with the maximum Cmax, the process continues to step S16'.

In step S16', the capacitance Cv of the variable capacitor 54 is set to a capacitance Cv with which the power receiving efficiency stored in step S13 becomes the maximum.

Modified Example of Third Embodiment

Figure 11:
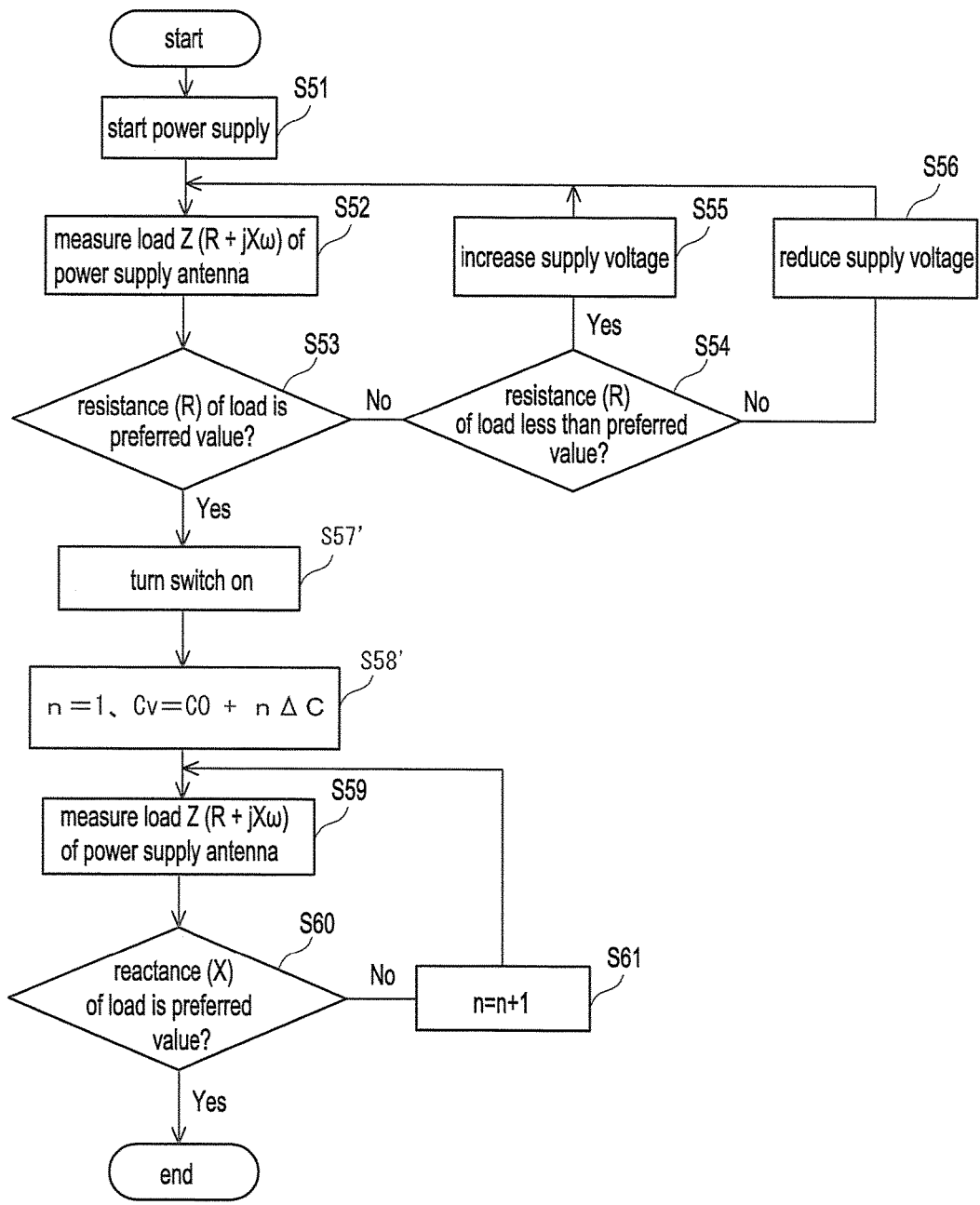
FIG. 11 is a flow chart describing an adjustment method of the operation point of the power supply circuit according to a modified example of the third embodiment.

FIG. 11 is a modified example of the flow of the operation point adjustment process of the power supply circuit 1 according to the third embodiment, and the switch part 6 in the power supply circuit 1 and the resonant capacitor 5 herein have the configurations illustrated in FIG. 9. The difference between FIG. 11 and FIG. 6 lies in steps S53 to S60 in FIG. 6, and herein, steps S57 and S58 of FIG. 6 are replaced with steps S57' and S58' of FIG. 11. Only the steps that are different are described below.

In step S57', the switch of the switch part 6 is turned on. Besides, in step S58', the capacitance Cv of the variable capacitor 54 is set to C0+ΔC (n=1).

Figure 6:
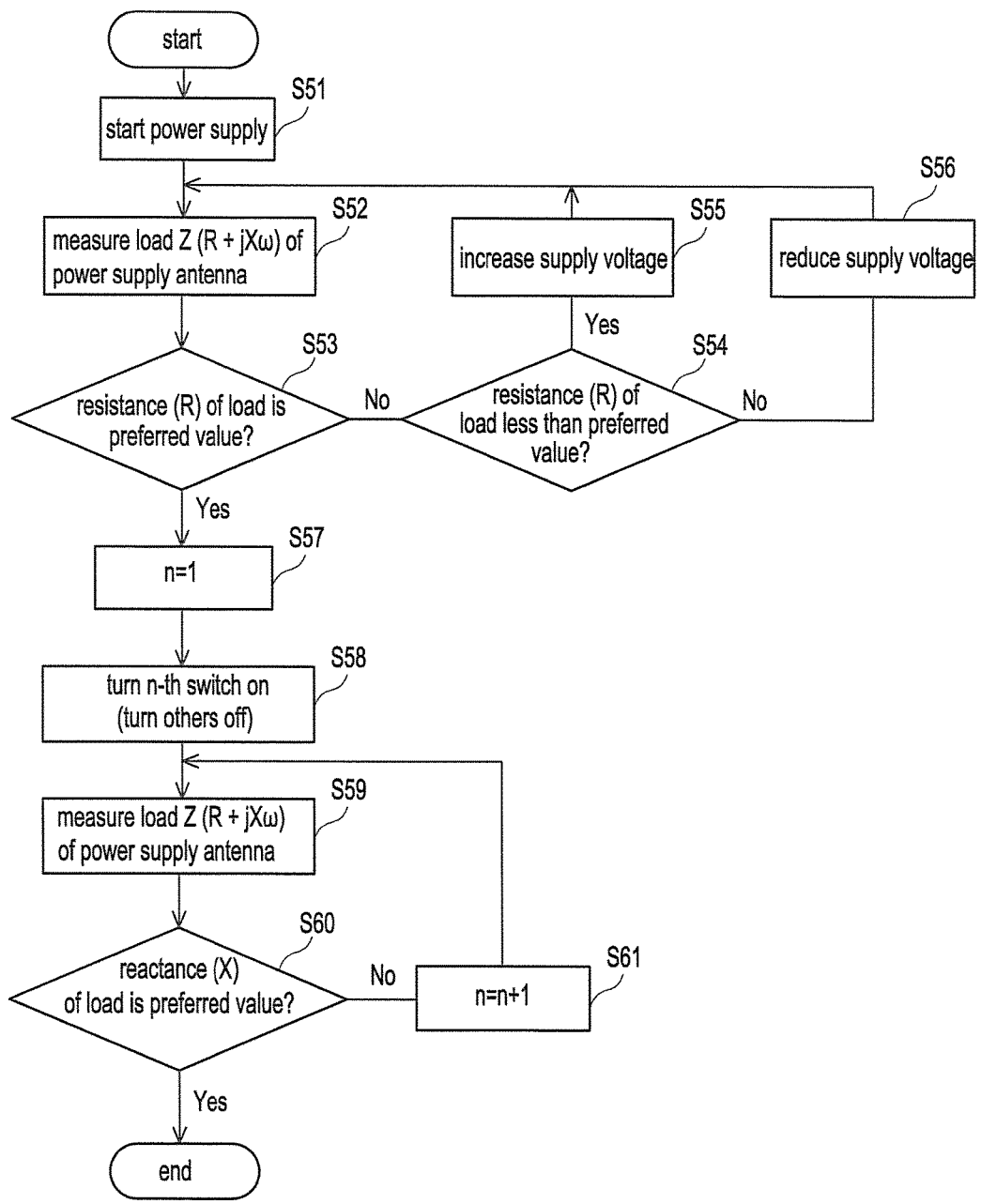
FIG. 6 is a flow chart describing an adjusting method of the operation point of the power supply circuit according to the third embodiment of the present invention.

In steps S59 to S60, the operations are similar to steps S59 and S60 of FIG. 6; therefore, the descriptions thereof are omitted. However, in step S60, whether the reactance (X) is consistent with the preferred value or not is determined. If the reactance (X) is not consistent with the preferred value, the process continues to the step S61, in which n is set to n+1, and then the process returns to the step S58', and the next capacitance Cv is set to C0+2ΔC (n=2, for example).

Modified Example of Fourth Embodiment

Figure 12:
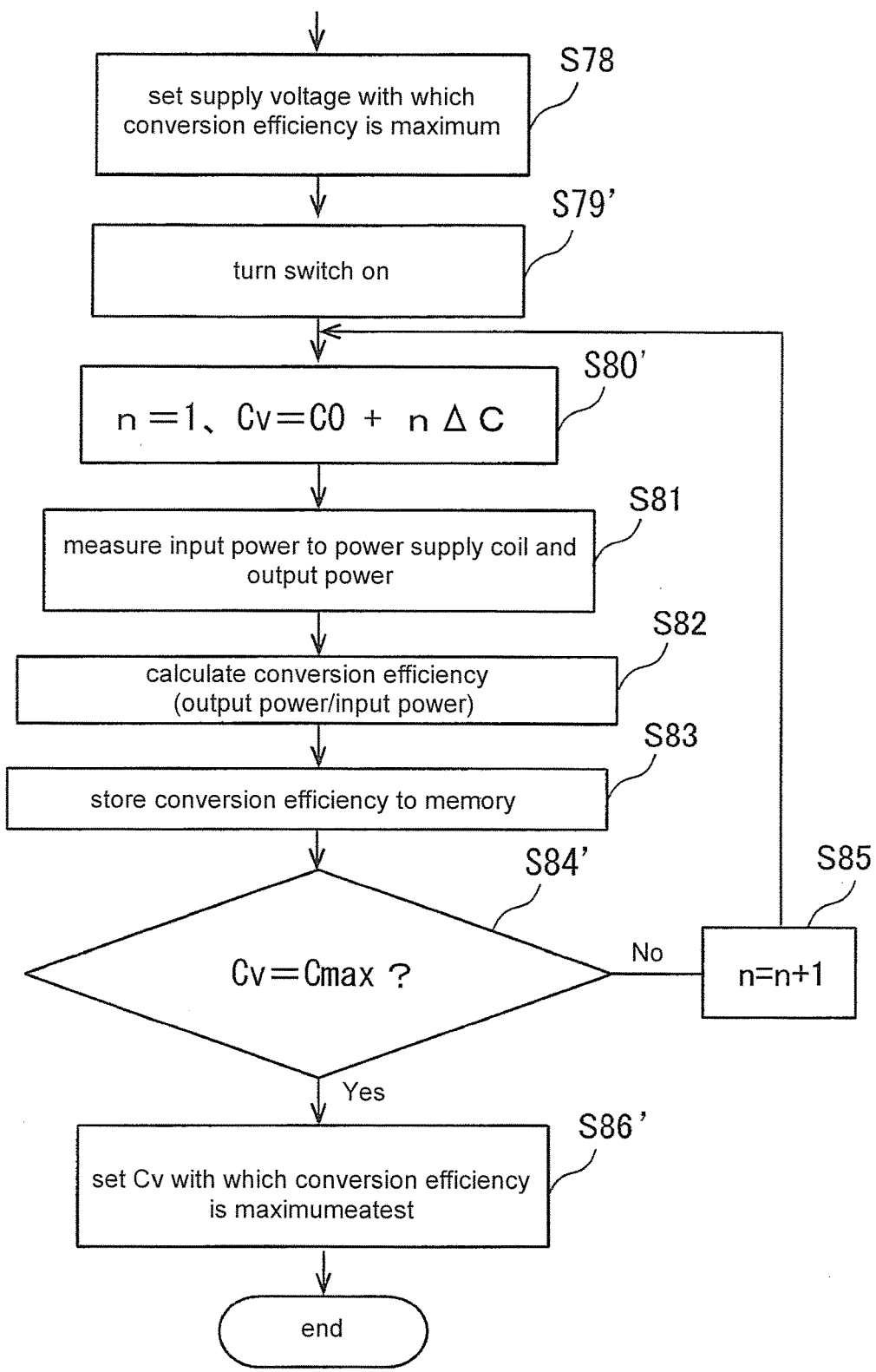
FIG. 12 is a flow chart describing an adjustment method of the operation point of the power supply circuit according to a modified example of the fourth embodiment.

FIG. 12 is a modified example of the flow of the operation point adjustment process of the power supply circuit 1 according to the fourth embodiment, and the switch part 6 in the power supply circuit 1 and the resonant capacitor 5 herein have the configurations illustrated in FIG. 9. The difference between FIG. 12 and FIG. 8 lies in steps S79 to S80 and S84 to S86 in FIG. 8, and herein, the steps S79 to S80 and S84 to S86 of FIG. 8 are replaced with the steps S79' to S80' and S84' to S86' of FIG. 12. Only the steps that are different are described below.

In step S79', the switch of the switch part 6 is turned on. Besides, in step S80', the capacitance Cv of the variable capacitor 54 is set to C0+ΔC (n=1).

Figure 8:
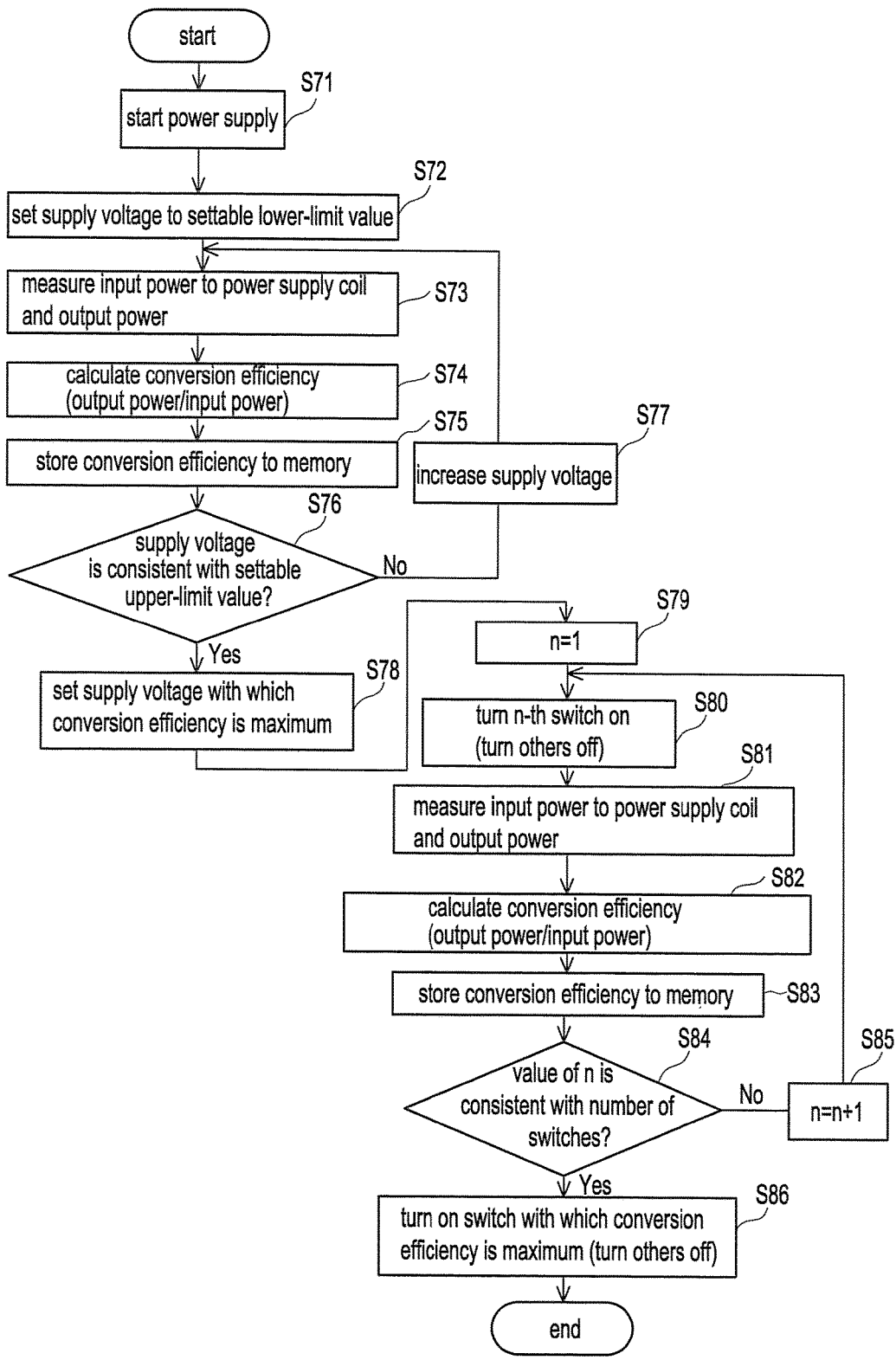
FIG. 8 is a flow chart describing an adjusting method of the operation point of the power supply circuit according to the fourth embodiment of the present invention.

In steps S81 to S83, the operations are the same as steps S81 and S83 of FIG. 8; therefore, the descriptions thereof are omitted.

In step S84', whether the capacitance Cv of the variable capacitor 54 reaches the maximum Cmax or not is determined. If the capacitance Cv is not consistent with the maximum Cmax, the process continues to step S85, in which n is set to n+1, and then the process returns to step S80', and the next capacitance Cv is set to C0+2ΔC (n=2, for example). If the capacitance Cv is consistent with the maximum Cmax, the process continues to step S86'.

In step S86', the capacitance Cv of the variable capacitor 54 is set to a capacitance Cv with which the conversion efficiency stored in the step S83 becomes the maximum.

The same effects are obtained by the abovementioned modified examples of the first to fourth embodiments. Moreover, it is possible to simplify the structure and the operations and to reduce the substrate area because the resonant capacitor 5 is configured with a single variable capacitor 54.

Other Modification Examples

The embodiments disclosed herein should be considered as examples, and should not be construed to limit the scope of the invention in any manner. The scope of the present invention is defined by the scope of the claims, rather than the abovementioned description of the embodiments, and, moreover, includes meanings equivalent to the scope of the claims and all modifications within the scope.

For example, the first to fourth embodiments indicate examples of operation flow charts in which the reactance is adjusted by controlling the reactance adjustment part after adjusting the resistance by controlling the power source, but the present invention is not limited thereto. In the present invention, the resistance may be adjusted by controlling the power source after adjusting the reactance by controlling the reactance adjustment part.

Also, the second embodiment illustrates, in addition to the configuration of the first embodiment, an example that is configured to obtain information of the maximum operation voltage and the minimum operation voltage and control the receiving voltage to more than the minimum operation voltage and less than the maximum operation voltage, but the present invention is not limited thereto. In the present invention, by adding the communication part to the configuration of the third and fourth embodiments, it is possible to configure to obtain information of the maximum operation voltage and the minimum operation voltage and control the receiving voltage to have more than the minimum operation voltage and less than the maximum operation voltage, which is the same as that in the second embodiment.

Also, the first to fourth embodiments illustrate examples configured to supply power from the power supply device to the power receiving device by using the magnetic resonance method, but the present invention is not limited thereto. In the present invention, it is possible to configure to supply power by using other methods.

Also, the third embodiment illustrates an example of an operation flow chart in which whether the reactance value is consistent with the preferred value or not when adjusting the reactance is determined, and the operation is finished if the reactance value is consistent with the preferred value, but the present invention is not limited thereto. In the present invention, by adding a memory to the configuration of the third embodiment, it is possible to perform operations that stores each reactance value in the memory when the first switch to the n-th switch are respectively turned on, and then selects a reactance value closest to the preferred value.

Also, the first, second and fourth embodiments illustrate examples of operation flow charts in which the resistance is adjusted by varying the supply voltage from the settable lower-limit value to the settable upper-limit value, but the present invention is not limited thereto. In the present invention, it is possible to perform operations that adjust the resistance by varying the supply voltage from the settable upper-limit value to the settable lower-limit value.

Also, the first to fourth embodiments illustrate examples in which the number of resonant capacitors and the number of switches included in the switch part are three, but the present invention is not limited thereto. In the present invention, the number of resonant capacitors and the number of switches included in the switch part may be other than three.

Also, the first to fourth embodiments illustrate examples in which a FET is used as a switching element having a parasitic capacitance, but the present invention is not limited thereto. That is, a switching element having a parasitic capacitance other than a FET may be used.

Also, in the first to fourth embodiments, the process of the controller of the present invention is described using flow charts of the flow-driven type in which the process is performed sequentially according to the processing flow, but the present invention is not limited thereto. In the present invention, the processing operation of the controller may be performed by an event-driven type processing that performs processing at the time of the occurrence of each event. In this case, the operation may be performed by an event-driven type processing entirely, or by a combination of an event-driven processing and a flow-driven processing.

What is claimed is:

1. A power supply device, comprising:
   a power supply antenna, supplying a power to a power receiving device;
   a reactance adjustment part, adjusting a reactance of the power supply antenna;
   a power source, supplying a voltage to the power supply antenna; and
   a controller, controlling the reactance adjustment part and the voltage of the power source, wherein the power source comprises a switching element that is switched at a predetermined drive frequency, the controller sets a voltage value applied to the switching element to be substantially zero when the switching element is being switched.

2. The power supply device according to claim 1, comprising:
   a communication part, from which the power receiving device obtains information of a receiving voltage.

3. The power supply device according to claim 2, comprising:
   an input power measurement part, measuring an input power provided to the power supply antenna.

4. The power supply device according to claim 3, comprising:
   an efficiency calculation part, calculating a power receiving efficiency of the power receiving device from the input power and the receiving voltage.

5. The power supply device according to claim 4, wherein the controller adjusts a resistance of the power supply antenna based on the power receiving efficiency.

6. The power supply device according to claim 2, wherein the communication part obtains a predetermined voltage range of the power receiving device.

7. The power supply device according to claim 6, wherein the controller adjusts a resistance of the power supply antenna while the receiving voltage is within the predetermined voltage range by controlling the voltage of the power source.

8. The power supply device according to claim 1, comprising:
   an impedance detector, detecting an impedance of the power supply antenna.

9. The power supply device according to claim 8, wherein the controller adjusts the resistance of the power supply antenna based on the impedance detected by the impedance detector.

10. The power supply device according to claim 1, comprising:
    a power measurement part, measuring an input power provided to the power supply antenna and an output power.

11. The power supply device according to claim 10, comprising:
    a conversion efficiency calculation part, calculating a conversion efficiency of power from the input power and the output power.

12. The power supply device according to claim 11, wherein the controller adjusts the resistance of the power supply antenna based on the conversion efficiency.

13. The power supply device according to claim 1, wherein the power supply antenna comprises a resonant capacitor that adjusts a reactance of the power supply antenna.

14. The power supply device according to claim 13, wherein the controller adjusts the reactance of the power supply antenna by adjusting a capacitance of the resonant capacitor.

15. The power supply device according to claim 13, wherein the resonant capacitor has a plurality of capacitors.

16. The power supply device according to claim 15, wherein the reactance adjustment part comprises a switch part that connects the power source to each of the plurality of capacitors.

17. The power supply device according to claim 16, wherein the controller adjusts the reactance of the power supply antenna by connecting at least one of the plurality of capacitors to the power source.

18. A power supply method, comprising:
    adjusting a resistance of a power supply antenna that supplies a power to a power receiving device by adjusting a supply voltage provided to the power supply antenna, wherein the step of adjusting the resistance of the power supply antenna comprises setting a voltage value applied to a switching element to be substantially zero when the switching element is being switched, the switching element that is switched at a predetermined drive frequency; and
    adjusting a reactance of the power supply antenna by controlling a reactance adjustment part that adjusts a reactance of the power supply antenna.

* * * * *